US011533382B2

(12) United States Patent
S et al.

(10) Patent No.: US 11,533,382 B2
(45) Date of Patent: Dec. 20, 2022

(54) PROVIDING USER SUBSCRIPTION NOMADICITY IN WIRELINE BROADBAND NETWORKS

(71) Applicant: Juniper Networks, Inc., Sunnyvale, CA (US)

(72) Inventors: Avinash S, Mysore (IN); Sunil Madhaorao Gandhewar, Bangalore (IN); Vidhya Bhushan Verma, Chhattisgarh (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1150 days.

(21) Appl. No.: 15/086,982

(22) Filed: Mar. 31, 2016

(65) Prior Publication Data

US 2017/0289291 A1   Oct. 5, 2017

(51) Int. Cl.
*H04L 67/563* (2022.01)
*H04L 41/08* (2022.01)
(Continued)

(52) U.S. Cl.
CPC ........ *H04L 67/563* (2022.05); *H04L 12/2869* (2013.01); *H04L 12/2898* (2013.01);
(Continued)

(58) Field of Classification Search
CPC ............. H04L 12/2869; H04L 67/2814; H04L 67/563; H04L 12/4633
(Continued)

(56) References Cited

U.S. PATENT DOCUMENTS 9,264,898 B2   2/2016   Schroeder
9,374,267 B2   6/2016   Poirier et al.
(Continued)

FOREIGN PATENT DOCUMENTS

CN   101155053 A   4/2008
CN   102314949 A   1/2012
(Continued)

OTHER PUBLICATIONS

"Understanding How MX Series Router Cloud CPE Services Virtualize Customer Premises Equipment (CPE) Services," Juniper Networks Inc., retrieved from http://www.juniper.net/techpubs/en_US/junos13.2/topics/concept/ccpe-overview.html, Feb. 23, 2016, 4 pp.
(Continued)

*Primary Examiner* — Vivek Srivastava
*Assistant Examiner* — Hien V Doan
(74) *Attorney, Agent, or Firm* — Shumaker & Sieffert, P.A.

(57) ABSTRACT

In general, techniques are described for providing user nomadicity in wireline broadband networks. A network device positioned in a wireline broadband network comprising a processor and an interface may be configured to perform the techniques. The processor may be configured to execute a first virtual customer premises equipment to provide, to a first subscriber, access to the wireline broadband network from a first subscription point in accordance with a first subscription. The processor may also be configured to provide, to a second subscriber, access to the wireline broadband network from the first subscription point in accordance with a second subscription. The interface may be configured to forward, in accordance with the first subscription, traffic received from the first subscription point and associated with the first subscriber, and forward, in accordance with the second subscription, traffic received from the
(Continued)

first subscription point and associated with the second subscriber.

26 Claims, 6 Drawing Sheets

(51) Int. Cl.
  *H04L 12/28* (2006.01)
  *H04L 41/50* (2022.01)
  *H04L 12/46* (2006.01)
(52) U.S. Cl.
  CPC .......... *H04L 12/4633* (2013.01); *H04L 41/08* (2013.01); *H04L 41/5077* (2013.01)
(58) Field of Classification Search
  USPC ........................................................ 709/227
  See application file for complete search history.

(56) References Cited

U.S. PATENT DOCUMENTS

| | | | |
|---|---|---|---|
| 9,641,957 | B2 | 5/2017 | Raleigh |
| 2013/0173797 | A1* | 7/2013 | Poirer ................ H04L 61/2528 709/225 |
| 2015/0169340 | A1 | 6/2015 | Haddad et al. |
| 2016/0241515 | A1* | 8/2016 | Pai ..................... H04L 63/0209 |

FOREIGN PATENT DOCUMENTS

| | | |
|---|---|---|
| CN | 102365630 A | 2/2012 |
| CN | 103379494 A | 10/2013 |
| CN | 105978708 A | 9/2016 |

OTHER PUBLICATIONS

Farinacci et al., "Generic Routing Encapsulation (GRE)," RFC 2784, Network Working Group, Mar. 2000, 9 pp.
Rigney et al., "Remote Authentication Dial In User Service (RADIUS)," RFC 2865, Network Working Group, Jun. 2000, 76 pp.
Rosen et al., "Multiprotocol Label Switching Architecture," RFC 3031, Network Working Group, Jan. 2001, 61 pp.
Lau et al., "Layer Two Tunneling Protocol—Version 3 (L2TPv3)," RFC 3931, Network Working Group, Mar. 2005, 94 pp.
Andersson et al., "LDP Specification," RFC 5036, Network Working Group, Oct. 2007, 135 pp.
Fajardo et al., "Diameter Base Protocol," RFC 6733, Internet Engineering Task Force (IETF), Oct. 2012, 152 pp.
Shatzkamer et al., "Achieving Nomadicity: Accessing the Internet Anytime, Anywhere," Building the Mobile Internet, Chapter 11, Mar. 11, 2011.
Extended Search Report from counterpart European Application No. 17164016.2, dated Jul. 11, 2017, 9 pp.
Response to Extended Search Report dated Oct. 9, 2017, from European Counterpart Application No. 17164016.2, filed Apr. 4, 2018, 18 pp.
Examination Report from counterpart European Application No. 17164016.2, dated Mar. 25, 2019, 5 pp.
Response filed Jul. 25, 2019 to the Examination Report from counterpart European Application No. 17164016.2, dated Mar. 25, 2019, 9 pp.
First Office Action and Search Report, and translation thereof, from counterpart Chinese Application No. 2017102057169, dated Oct. 14, 2019, 13 pp.
Examination Report from counterpart European Application No. 17164016.2, dated Apr. 22, 2020, 5 pp.
Second Office Action and Search Report, and translation thereof, from counterpart Chinese Application No. 201710205716.9, dated Jul. 7, 2020, 10 pp.
Response to Examination Report dated Apr. 22, 2020, from counterpart European Application No. 17164016.2, filed Aug. 19, 2020, 18 pp.

* cited by examiner

PROVIDING USER SUBSCRIPTION NOMADICITY IN WIRELINE BROADBAND NETWORKS

TECHNICAL FIELD

The techniques relate to wireline broadband networks, and more particularly, mobility of user subscriptions in wireline broadband networks.

BACKGROUND

A wireline broadband network is a network by which network connectivity is provided to the premises of a subscriber by a physical communication medium, such as a coaxial cable, an optical fiber, or a copper wire. A network service provider that operates the wireline broadband network may deploy customer premises equipment (CPE) that terminates the physical access medium and controls access to the wireline broadband network. In the context of wireline broadband networks, CPEs are often referred to as residential routers and may include cable modems, optical network terminals, digital subscriber line (DSL) modems, asynchronous (ADSL) modems, set-top-boxes (STBs), or combination router and modems. The CPE may generally act as a router capable of providing additional functionality, such as dynamic host configuration protocol (DHCP) server functionality, by which to control access to the wireline broadband network for the particular subscriber to which the CPE is deployed.

SUMMARY

In general, techniques are described that may be utilized by service provider network devices, such as a service gateway (SG) or a broadband network gateway (BNG), to allow for user subscription nomadicity in wireline broadband networks. Rather than deploy a fully-functional physical customer premises equipment (CPE) to a subscriber's premises in a manner that creates an anchored subscription point at the premises, the service provider network device may virtualize the CPE. In other words, the service provider network device may execute a virtual CPE (VCPE) that provides much of the functionality of the physical CPE. The virtualization of many of the services of the CPE may allow the service provider operating the wireline broadband network to easily redeploy the VCPE to or otherwise connect to the VCPE from any service provider network device located in the wireline broadband network. As such, subscribers may effectively carry their subscription to any location reached by the wireline broadband network operated by the service provider (and possibly other service providers), thereby providing what may be referred to as "user subscription nomadicity."

In one aspect, a method comprises executing, by a network device positioned in a wireline broadband network, a first virtual customer premises equipment to provide, to a first subscriber, access to the wireline broadband network from a first subscription point in accordance with a first subscription associated with the first subscriber and the first subscription point. The method also comprises providing, by the network device to a second subscriber, access to the wireline broadband network from the first subscription point in accordance with a second subscription associated with the second subscriber and a second subscription point. The method further comprises forwarding, by the network device in accordance with the first subscription, traffic received from the first subscription point and associated with the first subscriber, and forwarding, by the network device in accordance with the second subscription, traffic received from the first subscription point and associated with the second subscriber.

In another aspect, a network device positioned in a wireline broadband network comprises one or more processors configured to execute a first virtual customer premises equipment to provide, to a first subscriber, access to the wireline broadband network from a first subscription point in accordance with a first subscription associated with the first subscriber and the first subscription point, and provide, to a second subscriber, access to the wireline broadband network from the first subscription point in accordance with a second subscription associated with the second subscriber and a second subscription point. The network device also comprises one or more interfaces configured to forward, in accordance with the first subscription, traffic received from the first subscription point and associated with the first subscriber, and forward, in accordance with the second subscription, traffic received from the first subscription point and associated with the second subscriber.

In another aspect, a non-transitory computer-readable storage medium has stored thereon instructions that, when executed, cause one or more processors of a network device positioned in the wireline broadband network to execute a first virtual customer premises equipment to provide, to a first subscriber, access to the wireline broadband network from a first subscription point in accordance with a first subscription associated with the first subscriber and the first subscription point, provide, to a second subscriber, access to the wireline broadband network from the first subscription point in accordance with a second subscription associated with the second subscriber and a second subscription point, forward, in accordance with the first subscription, traffic received from the first subscription point and associated with the first subscriber, and forward, in accordance with the second subscription, traffic received from the first subscription point and associated with the second subscriber.

In another aspect, a network system comprises a wireline broadband network configured to provide access to a public network, and a network device positioned in the wireline broadband network. The network device comprises one or more processors configured to execute a first virtual customer premises equipment to provide, to a first subscriber, access to the wireline broadband network from a first subscription point in accordance with a first subscription associated with the first subscriber and the first subscription point, and provide, to a second subscriber, access to the wireline broadband network from the first subscription point in accordance with a second subscription associated with the second subscriber and a second subscription point. The network device also comprises one or more interfaces configured to forward, in accordance with the first subscription, traffic received from the first subscription point and associated with the first subscriber, and forward, in accordance with the second subscription, traffic received from the first subscription point and associated with the second subscriber.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
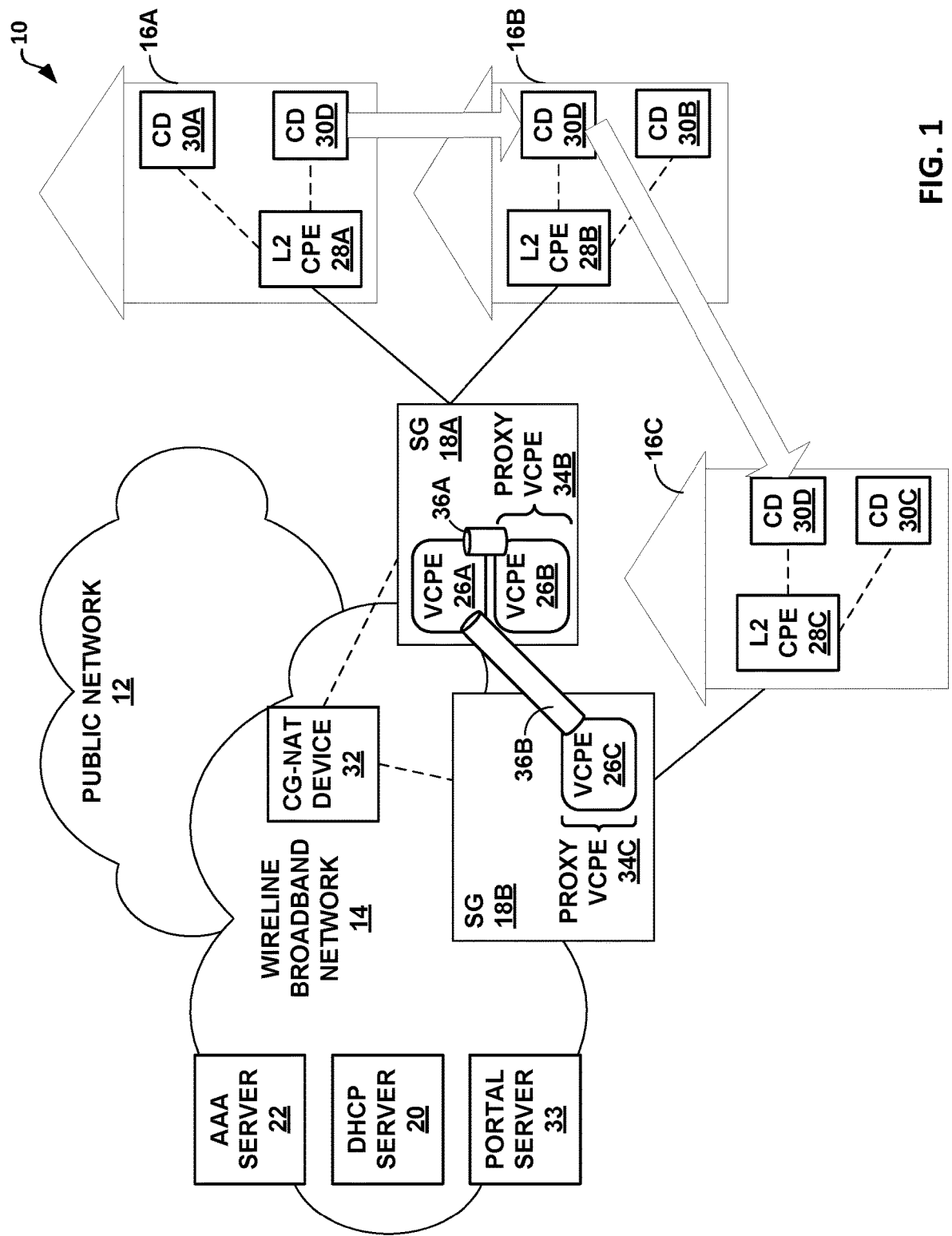
FIG. 1 is a diagram of an example system in which various aspects of the techniques described herein may be implemented.

FIG. 1 is a diagram of an example system 10 in which various aspects of the techniques described herein may be implemented. System 10 includes a public network 12 and a wireline broadband network 14. Although shown as separate networks 12 and 14, public network 12 may include portions of wireline broadband network 14. In other words, some portions of wireline broadband network 14 may form some portions of public network 12. Public network 12 may represent any publically accessible network, including what is commonly referred to as the "Internet."

Wireline broadband network 14 may represent any type of network that provides access to public network 12 via a physical communication medium, such as a coaxial cable, optical fiber, or copper telephone line. A service provider may operate wireline broadband network 14, providing different levels of service to subscribers for accessing public network 12. The different levels of service may include different amounts of bandwidth per month (e.g., 100 megabytes (MB)/month, 200 MB/month, etc.), different levels of volume of data, different levels of throughput (which may be marketed as different amounts of data per second, e.g., 20 megabits per second (Mbps), 40 Mbps, 100 Mbps, etc.), different levels of latency, or a combination of one or more of the foregoing. The different levels of service may be arranged in a large number of ways (and marketed as "service plans") to achieve different goals and serve different types of customers (e.g., business customers or residential customers).

In the example of FIG. 1, subscriber premises 16A-16C ("subscriber premises 16") are shown connecting to wireline broadband network 14 so as to access public network 12. Subscriber premises 16 each represent a physical location to which a subscription to access public network 12 is provided by way of one of the above noted exemplary dedicated physical communication mediums. Subscriber premises 16 may include business locations or residences (including single family homes, townhomes, condominiums, apartments, etc.). Each of the customers at each of subscriber premises 16 may agree by way of contract (or, in other words, subscribe) to one of the offered service plans detailing the service levels. Upon subscribing, the service provider may deploy the physical communication medium (when not already deployed) to subscriber premises 16, physically coupling subscriber premises 16 to wireline broadband network 14 via the deployed physical communication medium.

One end of the physical medium is terminated at wireline broadband network 14 by an active network device, examples of which are shown as service gateways (SGs) 18A and 18B ("SGs 18"). The term "active" is used before "network devices" to distinguish between network devices that actively route network traffic from relatively more passive network devices that switch network traffic between different physical communication mediums. Active network devices may include layer three network routing devices ("routers") acting as service gateways (SGs) or broadband network gateways (BNGs). Thus, while depicted in FIG. 1 as service gateways, service gateways 18 may represent in some examples BNGs, broadband remote access servers (BRASes), or other access gateways to the core of wireline broadband network 14. Passive network devices may include layer two switching devices.

Wireline broadband network 14 may further include a backend network, which is not shown in the example of FIG. 1 for ease of illustration purposes, configured to provide a number of different network support services to facilitate access to the services provided by wireline broadband network 14. For example, the backend network may include a dynamic host configuration protocol (DHCP) server 20 configured to execute DHCP and thereby distribute unique network addresses to subscriber devices. The distribution of unique network addresses allows for proper routing of network packets to individual subscriber devices.

The unexpected rise in the number of subscriber devices in conjunction with the rapid growth of public networks has resulted in an Internet protocol (IP) address space that (especially for IP version 4 or IPv4) is insufficient to assign a unique address to each and every subscriber device. To overcome such address space deficiencies, equipment installed at a subscriber's premises, which is often referred to as customer premises equipment (CPE), may perform address space conservation techniques, such as network address translation (NAT). CPE may, in addition to performing NAT, terminate the other end of the physical communication medium at subscriber premises.

CPE, such as cable modems, digital subscriber line (DSL) modems or optical network terminals (ONTs), may be configured to perform NAT so that a number of subscriber devices located at any given subscriber's premises may share a single unique network address. In implementing NAT, the CPE may be configured to assign each subscriber device a different local IP address and map each local IP address to a different port associated with the DHCP distributed unique IP address (which may be referred to as a "global IP address"). The CPE may therefore translate the global IP address and unique port to the local IP address for both traffic outgoing from and incoming to the respective subscriber premises, effectively extending each global IP address to a number of different subscriber devices and thereby slowing the consumption of the IP address space.

Another service provided by the backend network is an authentication, authorization and accounting (AAA) service. The backend network may include a AAA server 22 configured to execute or otherwise perform one or more AAA protocols, such as the Remote Authentication Dial In User Service (RADIUS) protocol or the next generation RADIUS protocol referred to as "Diameter." More information concerning the RADIUS protocol can be found in Request for Comments (RFC) 2865, entitled "Remote Authentication Dial-In User Service (RADIUS)," dated June 2000, the entire contents of which are hereby incorporated by reference as if set forth in their entirety. More information concerning the diameter protocol can be found in RFC 6733, entitled "Diameter Base Protocol," dated October 2012, the entire contents of which are also hereby incorporated by reference as if set forth in their entirety.

AAA server 22 may provide services to authenticate subscribers, authorize subscribers to access services provided by wireline broadband network 14 and account for utilization of the services provided by wireline broadband network 14. AAA server 22 may provide policies to SGs 18 during the authentication and authorization process that specify rules for enforcing access to the services provided by wireline broadband network 14 in accordance with the respective subscriber's service plan.

In accordance with the techniques described in this disclosure, SGs 18 may provide user subscription nomadicity in wireline broadband network 14. Rather than deploy physical customer premises equipment (CPE) to subscriber premises 16 and thereby tie the subscription to the subscriber premises 16 and create a fixed subscription point, SGs 18 may virtualize the CPE. In other words, SGs 18 may execute a virtual CPE (VCPE) 26A-26C for each of subscriber premises 16A-16C that provide much of the functionality of the physical CPE. The virtualization of various services performed by the physical CPE may allow the service provider operating wireline broadband network 14 to easily configure VCPEs 26A-26C of any one of the SGs located in wireline broadband network 14 so as to allow a subscriber to access wireline broadband network 14 in accordance with the corresponding subscriber's service agreement. As such, subscribers may effectively "carry" their subscription to any location reached by wireline broadband network 14 operated by the service provider (and possibly other wireline broadband networks operated by other service providers), thereby providing what may be referred to as "user subscription nomadicity."

VCPEs 26A-26C ("VPCEs 26") may be configured to operate in conjunction with one of layer two (L2) CPEs 28A-28C ("L2 CPEs 28") deployed at each of corresponding subscriber premises 16A-16C. For purposes of illustration, it is assumed that VCPE 26A is associated with L2 CPE 28A positioned in subscriber premises 16A, VCPE 26B is associated with L2 CPE 28B positioned in subscriber premises 16B, and VCPE 26C is associated with L2 CPE 28C positioned in subscriber premises 16C. Each of VCPEs 26 provides the AAA protocol services, and DHCP services along with L3 forwarding services and various other services, in lieu of these services being provided at the customer premises by a physical CPE. Each of VCPEs 26 may also provide the NAT services described above or the NAT services may be offloaded to a carrier grade (CG)-NAT device, such as CG-NAT device 32 shown in FIG. 1. More information concerning VCPEs (which may also be referred to as "cloud based CPE") can be found in U.S. Patent, Publication No. 2013/0173797, entitled "CLOUD BASED CUSTOMER PREMISES EQUIPMENT," published Jul. 4, 2013, the entire contents of which are hereby incorporated by reference as if set forth in its entirety.

L2 CPE 28 may each be configured to provide physical communication medium access and L2 switching functionality. That is, L2 CPE 28 may interact with the physical communication medium deployed to each of subscriber premises 16 and provide access to the physical communication medium (which may be referred to as layer one (L1) access). L2 CPE 28 may also provide an L2 interface by which to interface with a subscriber's computing device, which are shown as computing devices (CDs) 30A-30D ("CDs 30") in the example of FIG. 1. L2 CPE 28 may each provide the L2 interface to permit interaction with CDs 30 so as to receive from and send to CDs 30 L2 network traffic.

In the example shown in FIG. 1, L2 CPE 28A may initially forward received L2 network traffic from CDs 30A and 30D to VCPE 26A of SG 18A and deliver L2 network traffic received from VCPE 26A of SG 18A to CDs 30A and 30D. L2 CPE 28B may initially forward received L2 network traffic from CD 30B to VCPE 26B of SG 18A and deliver L2 network traffic received from VCPE 26B of SG 18A to CD 30B. L2 CPE 28C may initially forward received L2 network traffic from CD 30C to VCPE 26C of SG 18B and deliver L2 network traffic received from VCPE 26C of SG 18B to CD 30C.

It is further assumed for purposes of illustration that CD 30A and 30D are the possession of a subscriber having a subscription with a home location of subscriber premises 16A. Subscriber premises 16A may, in this respect, represent a home subscription point at which CDs 30A and 30D may access wireline broadband network 14 in accordance with a home subscription. As such, VCPE 26A may authenticate and authorize the subscriber in accordance with the AAA protocol (where L2 CPE 28A may be programmed to automatically provide subscriber credentials used for authentication and authorization). VCPE 26A may, during this authentication and authorization process, retrieve the above-noted policies from AAA server 22 and provide access to the wireline broadband network 14 in accordance with the policies of the home subscription. In this respect, SG 18A may execute VPCE 26A for the subscriber associated with subscription point 16A to provide access to wireline broadband network 14 by CD 30A and 30D in accordance with the home subscription.

The subscriber of subscriber premises 16A may travel from subscriber premises 16A to subscriber premises 16B, moving CD 30D from subscriber premises 16A to subscriber premises 16B. Subscriber premises 16B, as shown in the example of FIG. 1, couples to the same SG, i.e., SG 18A, as that to which subscriber premises 16A couples. For subscriber premises 16B, SG 18A may, as noted above, execute VCPE 26B for subscribe premises 16B. VCPE 26B may provide access to wireline broadband network 14 in conjunction with L2 CPE 28B for subscriber premises 16B according to a subscription agreed upon by the subscriber of subscriber premises 16B, effectively establishing a subscription point at subscriber premises 16B. It is assumed for purposes of illustration that CD 30B is the possession of the subscriber having the subscription with the home location of subscriber premises 16B.

CD 30D may access wireline broadband network 14 via VCPE 26B and L2 CPE 28B using the subscription credentials associated with VCPE 26B the subscription point at subscriber premises 16B. However, the subscription associated with subscription point at subscriber premises 16B may not be the same in terms of service level of the home subscription as that for the subscriber of the subscription point at subscriber premises 16A.

As such, the subscriber of CD 30D may receive access to wireline broadband network 14 via VCPE 26B direct CD 30D to access a web portal (which may also be referred to as an "authentication portal" or "portal") serviced by wireline broadband network 14 by which the subscriber may initiate access to wireline broadband network 14 in accordance with the subscriber's home subscription while being located at remote subscriber premises 16B. Wireline broadband network 14 may include a portal server device 33 ("portal server 33") that may be positioned, as one example, in the above-noted backend network, that serves the web portal. The web portal may include fields in which the subscriber of CD 30D may enter user credentials. Portal server 33 may receive the user credentials and interact with AAA server 22 in accordance with the AAA protocol to authenticate the subscriber. Although shown as a separate device 33, AAA server 22 may include portal server 33 and provide the web portal by which the user may enter user credentials.

Portal server 33 may interface with AAA server 22 to authenticate the user credentials and thereafter authorize the subscriber, by way of CD 30D to access the services associated with the subscriber's actual home subscription point (16A) in accordance with the service plan to which the subscriber has subscribed. AAA server 22 may provide this authorization to SG 18A and indicate both the VCPE associated with the subscriber's home subscription point, i.e., VCPE 26A in the example of FIG. 1, and which of the SGs is configured to execute VCPE 26A. In response to receiving the authorization, SG 18A may configure VCPE 26B associated with subscriber premises 16B to act as a proxy VCPE for CD 30D.

To distinguish between VCPE 26B acting as a proxy VCPE for VCPE 26A and VCPE 26B itself, VCPE 26B may be referred to as "proxy VCPE 34B." Proxy VCPE 34B may act on behalf of another VCPE, such as VCPE 26A, to service traffic from CD 30D (nomadic user), while VCPE 26B may continue to service traffic from CD 30B. In this respect, reference to proxy VCPE 34B may refer to the portion of VCPE 26B that acts on behalf of VCPE 26A to service traffic (identified, for example, by IP address or hardware address) from/to CD 30D in accordance with the subscription associated with subscriber premises 16A, and reference to VCPE 26B may refer to the portion of VCPE 26B dedicated to servicing traffic (identified, for example, by IP address or hardware address) from/to CD 30B in accordance with the subscription associated with subscriber premises 16B. Although described as reconfiguring an existing VCPE, i.e., VCPE 26B in the example of FIG. 1, to act, in part, as a proxy VCPE for CD 30D, SG 18A may instantiate a new proxy VCPE 34B that is executed separate from VCPE 26B. In other words, proxy VCPE 34B may represent a distinct VCPE from VCPE 26B or be integrated into VCPE 26B.

Upon configuring proxy VCPE 34B (whether as a separate or integrated proxy VCPE), SG 18A may then establish a tunnel 36A from proxy VCPE 34B to VCPE 26A and remove any access restrictions from proxy VCPE 34B, for traffic from CD 30D, applied in accordance with the subscription associated with the subscription point of subscriber premises 16B. Tunnel 36A may tunnel this traffic from CD 30D received by proxy VCPE 34B to VCPE 26A (where such traffic is associated with CD 30D given that proxy VCPE 34B is associated with CD 30D), which may allow VCPE 26A to provide access to the services in accordance with the policies that enforce the subscriber's subscription from 16A, rather than the subscription associated with subscriber premises 16B. In this respect, the techniques may allow for user subscription nomadicity.

The foregoing techniques may be extended to instances where a different SG executes the proxy VCPE from that which executes VCPE 26A. Assume for purposes of illustration that the subscriber moves from subscriber premises 16A to subscriber premises 16C, which accesses wireline broadband network 14 via SG 18B and not via SG 18A. The subscriber may go through a similar process as that discussed above to access wireline broadband network 14 using the subscriber's subscription rather than the subscription associated with subscriber premises 16C and enforced by VCPE 26C. In this instance, SG 18B, once AAA server 22 provides authorization for the subscriber of CD 30D to access wireline broadband network 14 as per home subscription 16A, may configure VCPE 26C to act as proxy VCPE 34C, effectively transitioning access for CD 30D via VCPE 26C in accordance with the subscription associated with the subscription point at subscriber premises 16C to access via VCPE 26A in accordance with the subscription associated with the subscription point at subscriber premises 16A. SG 18B may next establish tunnel 36B from proxy VCPE 34C to VCPE 26A. Again, tunnel 36B may tunnel traffic between proxy VCPE 34C and VCPE 26A associated with CD 30D, which may allow VCPE 26A to provide access to the services in accordance with the policies that enforce the subscriber's subscription rather than the subscription associated with subscriber premises 16C. In instances where VCPE 26A is not currently being executed by SG 18A, creation of tunnel 36B may trigger SG 18A to execute VCPE 26A. In this respect, the techniques may allow for user subscription nomadicity despite that VCPE 26A and proxy VCPE 34C are being executed by different SGs, i.e., SG 18A and SG 18B in the example of FIG. 1.

The user nomadicity enabled by the techniques described in this disclosure may provide a number of advantages. First, the user nomadicity techniques may provide mobility for wireline broadband subscribers. Second, the user nomadicity techniques may allow a single subscription point to host multiple subscriptions, potentially allowing for a larger source of revenue in the context of premises sharing by non-related individuals (e.g., college roommates) or for renter and tenant contexts to provide a few examples. User nomadicity in accordance with the techniques of this disclosure may also allow for mobility across service providers, thereby allowing for L3 wholesale and/or roaming.

Figure 2:
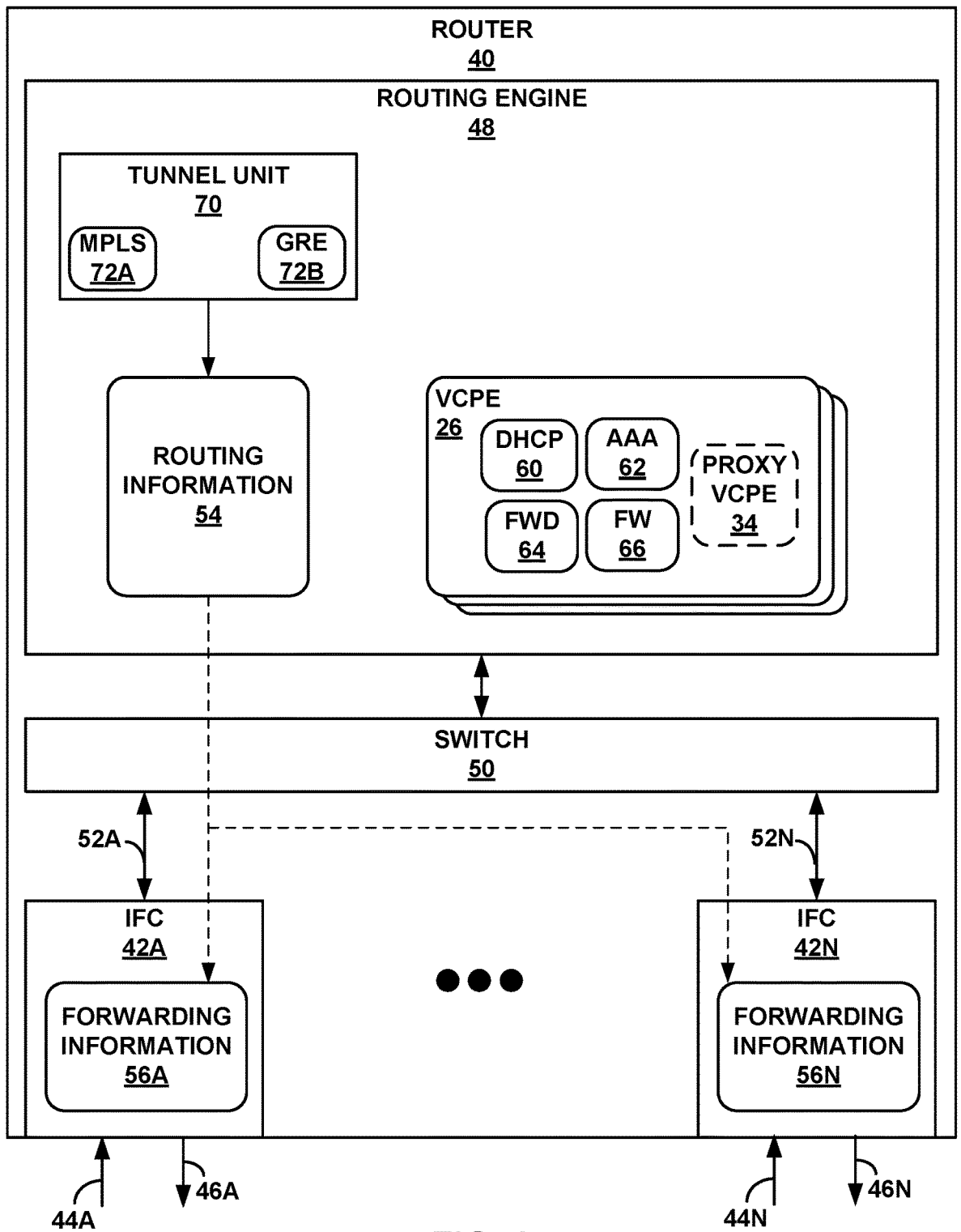
FIG. 2 is a block diagram illustrating an exemplary router that implements techniques described in this disclosure.

FIG. 2 is a block diagram illustrating an exemplary router 40 configured to perform various aspects of the user nomadicity techniques described in this disclosure. Router 40 may represent an example of either one of SGs 18 shown in the example of FIG. 1. While described with respect to router 40, the techniques may be implemented by any other type of network device capable of executing VCPE 26 or proxy VCPE 34.

In the example of FIG. 2, router 40 includes interface cards 42A-42N ("IFCs 42") configured to receive and send data units, such as packet flows, via network links 44A-44N and 46A-46N, respectively. Router 40 may include a chassis (not shown) having a number of slots for receiving a set of cards, including IFCs 42. Each card may be inserted into a corresponding slot of the chassis for electrically coupling the card to routing engine 48 via high-speed switch 50 and internal data paths 52A-52N ("internal data paths 52").

Switch 50 also provides an interconnect path between each of IFCs 42. Switch 50 may comprise, for example, switch fabric, switchgear, a configurable network switch or hub, or other high-speed switching mechanisms. Internal data paths 52 may comprise any form of communication paths, such as electrical paths within an integrated circuit, external data busses, optical links, network connections, wireless connections, or other communication paths. IFCs 42 may be coupled to network links 44A-44N and 46A-46N via a number of physical interface ports (not shown). Generally, IFCs 42 may each represent one or more network interfaces by which router 40 may interface with links of a network, such as the links of wireline broadband network 14 and the links between SGs 18 and subscriber premises 16 shown in the example of FIG. 1.

In general, routing engine 48 operates as a control unit for router 40. Routing engine 48 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 48 may further include a non-transitory computer readable medium or other computer-readable storage devices, which may include dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include or otherwise store instructions that, when executed, cause a programmable processor to perform the techniques described in this disclosure. These instructions may form a computer program, which may comprise software or other executable files.

Routing engine 48 may execute, although not shown in the example of FIG. 2 for ease of illustration purposes, one or more routing protocols, such as an interior gateway protocols (IGP) or exterior gateway protocols (EGP). Interior gateway protocols may include an open shortest path first (OSPF) routing protocol, an intermediate system to intermediate system (IS-IS) routing protocol, a routing information protocol (RIP) routing protocol, and an interior gateway routing protocol (IGRP). An example exterior gateway protocols is a border gateway protocol (BGP). Routing engine 48 may execute the routing protocols to obtain and distribute routing information routing information 54. Routing information 54 may represent a topology of the network, i.e., wireline broadband network 14 in the example of FIG. 1. Routing information 54 may define the topology using a graph or other data structure with nodes of the graph each representing a different routing network device and edges of the graph each representing a link between two nodes. Routing information 54 may assign costs to each edge within the graph data structure.

By executing one or more routing protocols, routing engine 48 may resolve the graph data structure based on the costs to identify paths through the network to each destination. Routing engine 48 may, in accordance with the routing protocols, reduce the paths to a set of next hops that identify a "next hop" in the path as an interface and port of IFCs 42 to which a network packet destined for each destination is to be forwarded. The collection or, in other words—set, of next hops is denoted as forwarding information 56. Routing engine 48 may install a copy of forwarding information 56 within each of IFCs 42A-42N (where the copies are shown as "forwarding information 56A-56N"). Installation of forwarding information 56 effectively programs IFCs 42 to forward network traffic within the context of wireline broadband network 14. As such, IFCs 42 may include specially built hardware, such as an application specific integrated circuit (ASIC), configured to form a so-called "forwarding plane" when programmed with forwarding information 56.

As further shown in the example of FIG. 2, routing engine 48 may also be configured to execute VCPEs 26 and proxy VCPEs 34. Routing engine 48 may execute VCPEs 26 for each subscriber premises 16 that router 40 services. Each of VCPEs 26 may provide access to wireline broadband network 14 to a corresponding one of subscriber premises 16 in accordance with the subscription purchased by the subscribers responsible for the corresponding one of subscriber premises 16. Routing engine 48 may execute proxy VCPEs 34 for each nomadic CD accessing router 40 via one of L2 CPE 28 without using the subscription associated with the one of subscriber premises 16 in which the one of L2 CPE 28 is located (and not sharing the existing subscription of another nomadic CD).

VCPEs 26 may be configured to execute many of the L3 services previously executed by physical CPE. As such, VCPEs 26 may each execute, to provide a few examples, a DHCP protocol 60 ("DHCP 60"), a AAA protocol 62 ("AAA 62," which may also be referred to as "AAA client 62"), L3 forwarding and/or other (beyond L3) routing 64 ("FWD 64"), and firewall services 66 ("FW 66"). DHCP 60 may represent a unit configured to execute DHCP to obtain a global IP address. AAA 62 may represent a unit configured to execute one of the above mentioned AAA protocols to provide authentication, authorization and accounting services. FWD 64 may represent a unit configured to provide L3 forwarding and/or routing of network traffic for the corresponding one of subscriber premises 16. FW 66 may represent a unit configured to provide firewall services and potentially other security services, such as intrusion detection prevention (IDP) services, anti-virus services, anti-malware services, or any other type of security services. Although not shown in the example of FIG. 2 given the presence of CG-NAT device 32, each of VCPEs 26 may also include a unit configured to provide NAT services (which may be activated, e.g., when CG-NAT device 32 is not included within wireline broadband network 14).

As described above, VCPE 26 may be configured to act as a proxy VCPE, which is denoted as proxy VCPE 34 with dashed lines to indicate that proxy VCPEs 34 do not provide VCPE services for a particular one of subscriber premises 16, but instead act as a proxy for an existing one of VCPEs 26. VCPEs 26 are shown as performing a certain subset of services and may perform other services not shown for ease of illustration purposes, such as wireless local area network (WLAN) control services, centralized management and controlling services, unified threat management (UTM) services, reporting services, network-based storage services, virtual desktop services, remote maintenance services, and site security and automation services.

Routing engine 48 may also include a tunnel unit 70 configured to establish one or more tunnels, such as tunnels 36 shown in the example of FIG. 1, in accordance with one or more exemplary tunneling protocols 72A and 72B ("tunneling protocols 72"). Although described with respect to two tunneling protocols 72, the techniques may be performed with respect to any tunneling protocol capable of tunneling network traffic between one of proxy VCPEs 34 and one of VCPEs 26 (whether executed by the same routing engine or different routing engines of different routers).

Tunneling protocol 72A (illustrated in FIG. 2 as "MPLS 72A") may represent a first tunneling protocol that establishes tunnels in accordance with multi-protocol label switching (MPLS) protocols. More information concerning the architecture of MPLS can be found in RFC 3031, entitled "Multiprotocol Label Switching Architecture," and dated January 2001, the entire contents of which are hereby incorporated by reference as if set forth in its entirety. MPLS protocols include a label distribution protocol (LDP) described in RFC 5036, entitled "LDP Specification", dated October 2007, the entire contents of which are hereby incorporated by reference as if set forth in its entirety. MPLS tunneling protocol 72A may form tunnels referred to as "label switched paths," which are commonly abbreviated as "LSPs."

Tunneling protocol 72B (illustrated in FIG. 2 as "GRE 72B") may represent a second tunneling protocol that establishes tunnels using encapsulation in accordance with a Generic Routing Encapsulation (GRE) protocol. More information concerning GRE can be found in RFC 2784, entitled "Generic Routing Encapsulation (GRE)," dated March 2000, the entire contents of which are hereby incorporated by reference as if set forth in its entirety. Although not shown, tunnel unit 70 may also establish tunnels 36 in accordance with a Layer Two Tunneling Protocol (L2 TP) version 3. More information regarding the L2 TP can be found in RFC 3931, entitled "Layer Two Tunneling Protocol—Version 3 (L2 TPv3)," dated March 2005, the entire contents of which are hereby incorporated by reference as if set forth in its entirety.

In operation, CD 30D located, for example, at subscriber premises 16B or 16C may access portal server 33 to initiate the change in subscription from that associated with either of subscriber premises 16B or 16C to that associated with subscriber premises 16A. Portal server 33 may receive the user credentials, and utilize the user credentials to authenticate the subscriber using CD 30D via interactions with AAA server 22. During authentication of the subscriber, AAA client 62 may retrieve information identifying the one of VCPEs 26 (executed by routing engine 48 of router 40 or some other routing engine 48 of a different router) associated with the subscriber. It is assumed for purposes of illustration that the information identifying VCPE 26A shown in the example of FIG. 1.

Assuming the subscriber is successfully authenticated by AAA server 22, AAA client 62 of VCPE 26 may configure one of proxy VCPE 34 (i.e., either proxy VCPE 34B or proxy VCPE 34C in the example of FIG. 1), whereupon the one of proxy VCPE 34 may interface with tunnel unit 70 to establish one of tunnels 36 (e.g., either of tunnels 36A or 36B shown in the example of FIG. 1) between the one of proxy VCPEs 34 and VCPE 26A. Tunnel unit 70 may establish one of tunnels 36 by updating routing information 54 to include tunnel 36A. Routing engine 48 may resolve routing information 54, including the one of tunnels 36, to generate forwarding information 56. Routing engine 48 may then install forwarding information 56 in IFCs 42 thereby configuring the one of tunnels 36 between the one of proxy VCPEs 34 and VCPE 26A. Tunnel unit 70 may interface with AAA 62 to indicate that tunnel 26A has been successfully installed, whereupon AAA 62 may configure a firewall filter within FW 66 indicating that all traffic received by the one of proxy VCPEs 34 from CD 30D (as identified by the IP address assigned to CD 30D via DHCP 60) is to be redirected through the tunnel to VCPE 26A. The one of proxy VCPEs 34 may next, for the particular IP address assigned to CD 30D, remove the limited access to wireline broadband network 14, thereby allowing VCPE 26A to perform AAA operations (accounting), security operations, and subscription enforcement in accordance with the subscription associated with the subscriber using CD 30D rather than the subscription associated directly with subscriber premises 16B (in this example).

In this respect, the subscriber responsible for subscriber premises 16B may access wireline broadband network 14 in accordance with a first subscription associated with subscriber premises 16B enforced by VCPE 26B. The subscriber using CD 30D located as subscriber premises 16B may access wireline broadband network 14 in accordance with a second subscription associated with subscriber premises 16A via VCPE 26A using the one of proxy VCPEs 34 and the corresponding one of tunnels 36.

Figure 3:
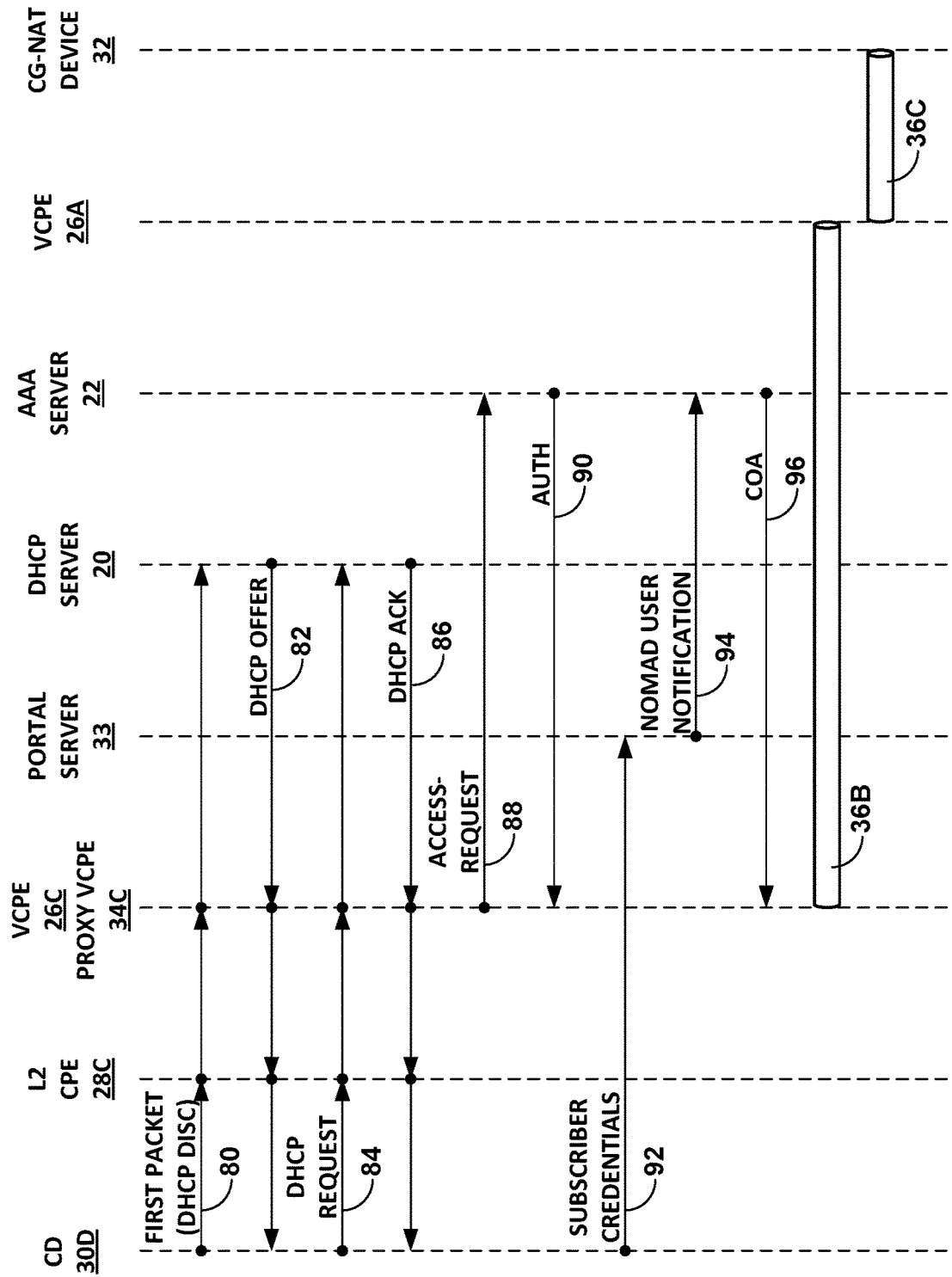
FIG. 3 is a diagram illustrating interactions between various devices shown in system of FIG. 1 configured to perform the user nomadicity techniques described in this disclosure.

FIG. 3 is a diagram illustrating interactions between various devices shown in system 10 of FIG. 1 configured to perform the user nomadicity techniques described in this disclosure. The following interactions are described in the context of CD 30D accessing wireline broadband network 14 from subscriber premises 16C at the direction of a subscriber that does not manage the subscription for subscriber premises 16C.

Initially, CD 30D may issue a first packet 80 in accordance with DHCP to discover DHCP server 20. First packet 80 may represent the first packet CD 30D sends when attempting to access wireline broadband network 14 from subscriber premises 16C. First packet 80 may be referred to as a DHCP discover packet (shown as "DHCP DISC 80"). L2 CPE 28C may receive DHCP discover packet 80 and perform L2 bridging to switch packet 80 to VCPE 26C. DHCP 60 of VCPE 26C may be configured to act as a DHCP relay and forwards DHCP discover packet 80 to DHCP server 20.

DHCP server 20 may respond to DHCP discover packet 80 by sending a DHCP offer packet 82 that offers an IP address for use by CD 30D. DHCP 60 of VCPE 26C may receive DHCP offer packet 82. DHCP 60, acting as the DHCP relay, may forward DHCP offer packet 82 to L2 CPE 28C, which switches packet 82 to CD 30D. CD 30D may respond with a DHCP request 84, requesting the IP address identified in DHCP offer packet 82. L2 CPE 28C may switch packet 84 to VCPE 26C, where DHCP 60 of proxy VCPE 34C relays packet 84 to DHCP server 20. DHCP server 20 may, in response to DHCP request packet 84, respond with a DHCP acknowledgement (ACK) packet 86 that acknowledges the request and grants CD 30D use of the offered IP address. DHCP 60 of VCPE 26C relays packet 86 to L2 CPE 28C, which switches packet 86 to CD 30D. CD 30D may next configure the interface by which access to wireline broadband network 14 is to occur with the IP address.

VCPE 26C may, either during the interactions with DHCP server 20 or after CD 30D has been granted use of the IP address, transmit an access-request packet 88 in accordance with the RADIUS or other AAA protocol to AAA server 22. The access-request may request authorization to access wireline broadband network 14. AAA server 22 may respond with an authorization packet 90. Authorization packet 90 may specify the IP address of CG-NAT device 32, and provide a dynamic profile. The dynamic profile may provide for instructions and/or services to provide services for which the subscriber using CD 30C has subscribed (given that the proxy VCPE has not yet been configured to provide services for which the subscriber using CD 30D has subscribed).

CD 30D may access portal server 33 (e.g., via a web browser directed to access a uniform resource locator (URL) associated with a web page hosted by the portal server 33) and provide subscriber credentials 92. Portal server 33 may generate a nomad user notification packet 94 that includes subscriber credentials 92 and notifies AAA server 22 that the subscriber operating CD 30D is a nomad user requesting the subscription associated with the subscriber operating CD 30D.

Upon authenticating subscriber credentials 92, AAA server 22 may generate a change of authorization (CoA) 96 indicating the VCPE associated with the subscription associated with the subscriber operating CD 30D (i.e., VCPE 26A in the example of FIG. 1). In response to the CoA 96 authorizing the subscriber to access wireline broadband network 14 in accordance with the subscription associated with subscriber premises 16A, VCPE 26C may configure proxy VCPE 34C. CoA 96 may also specify the firewall filter to configure FW 66 of proxy VCPE 34C to redirect traffic originating from the IP address assigned to CD 30D to the tunnel between proxy VCPE 34C and VCPE 26A (i.e., tunnel 36B in this example). CoA 96 may also indicate that any rate limiting or other restrictions on proxy VCPE 34C associated with subscription premises 16C should be removed. AAA server 22 may transmit CoA 96 to proxy VCPE 34C.

In response to CoA 96, proxy VCPE 34C may interface with tunnel unit 70 to establish tunnel 36B. FW 66 may also install the firewall filter so that all traffic received by proxy VCPE 34C from CD 30D is redirected through tunnel 36B to VCPE 26A. VCPE 26A may establish a tunnel 36C (not shown in the example of FIG. 1 for ease of illustration purposes) to CG-NAT device 32 so that NAT services may be performed prior to the traffic from CD 30D reaching wireline broadband network 14. SG 18A may configure tunnel 36C as an IP over IP version 6 (IPv6) tunnel. VCPE 26A may perform the AAA services (such as accounting) and any other services instead of proxy VCPE 34C in accordance with the subscription associated with the subscriber operating CD 30D.

Figure 4:
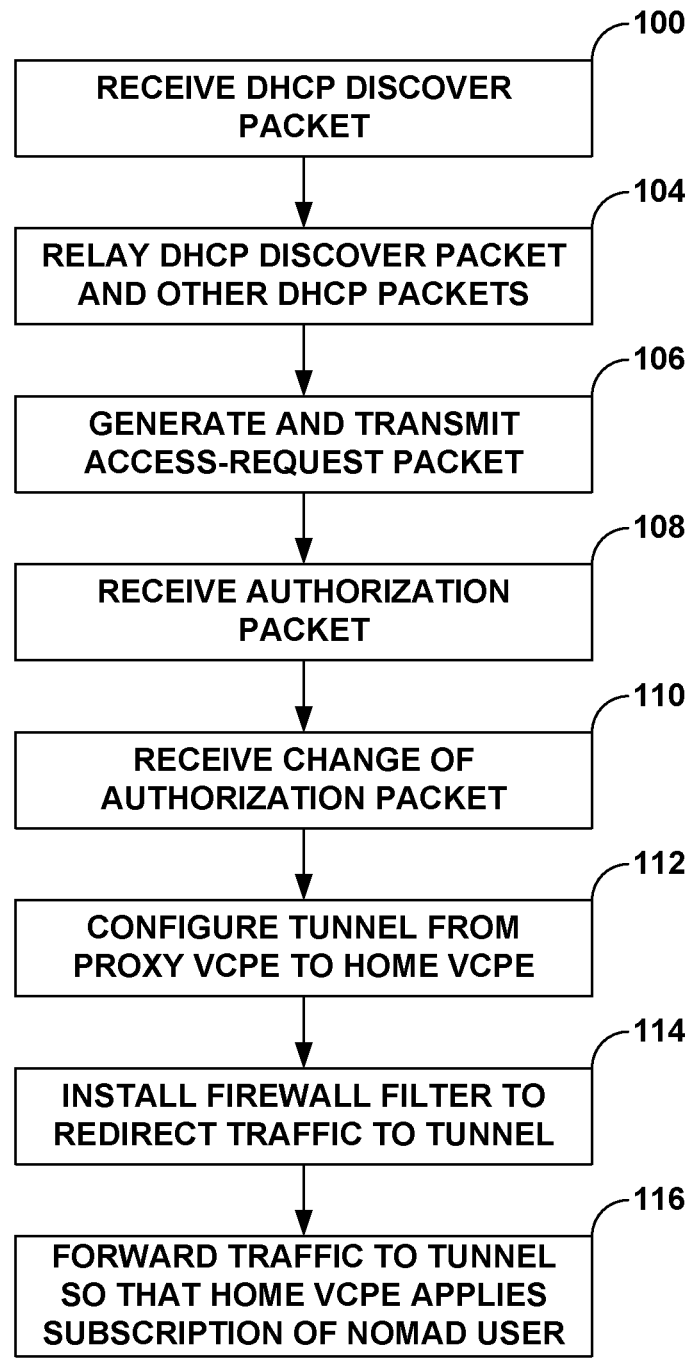
FIG. 4 is a flowchart illustrating exemplary operation by a network device in performing various aspects of the user nomadicity technique described in this disclosure.

FIG. 4 is a flowchart illustrating exemplary operation by a network device in performing various aspects of the user nomadicity technique described in this disclosure. Initially, the network device, e.g., router 40, may receive a first packet, i.e., DHCP discover packet 80 in the example of FIG. 3, from a computing device, i.e., CD 30D of FIG. 1 (100) via VCPE 26C. DHCP 60 of VCPE 26C may be configured to act as a DHCP relay and forwards DHCP discover packet 80 to DHCP server 20, while also performing relay operations with respect to subsequent DHCP packets (e.g., DHCP offer packet 82, DHCP request packet 84 and DHCP ACK packet 86) (104).

AAA 62 of VCPE 26C may, either during the interactions with DHCP server 20 or after CD 30D has been granted use of the IP address, generate and transmit an access-request packet 88 in accordance with the RADIUS protocol to AAA server 22. In response to the access-request packet 88, AAA 62 of VCPE 26C may receive an authorization packet 90 (108). Authorization packet 90 may specify the IP address of CG-NAT device 32, and provide a dynamic profile.

AAA 62 of VCPE 26C may authorize CD 30D to access portal server 33. As such, CD 30 may access portal server 33 (e.g., via a web browser directed to access the URL) and provide subscriber credentials 92. Portal server 33 may generate a nomad user notification packet 94 that includes subscriber credentials 92 and notifies AAA server 22 that the subscriber operating CD 30D is a nomad user requesting the subscription associated with the subscriber operating CD 30D.

Upon authenticating subscriber credentials 92, AAA server 22 may generate a change of authorization (CoA) 96 indicating the VCPE associated with the subscription associated with the subscriber operating CD 30D (i.e., VCPE 26A in the example of FIG. 1). CoA 96 may also specify the firewall filter to configure FW 66 of proxy VCPE 34C to redirect traffic originating from the IP address assigned to CD 30 to the tunnel between proxy VCPE 34C and VCPE 26A (i.e., tunnel 36B in this example). CoA 96 may also indicate that any rate limiting or other restrictions on proxy VCPE 34C should be removed. AAA server 22 may transmit CoA 96 to proxy VCPE 34C.

Proxy VCPE 34C may receive CoA 96 (110). In response to CoA 96, proxy VCPE 34C may interface with tunnel unit 70 to configure tunnel 36B from proxy VCPE 34C to VCPE 26A (which may be referred to as "home VCPE 26A") (112). FW 66 may also install the firewall filter so that all traffic received by proxy VCPE 34C from CD 30 is redirected through tunnel 36B to VCPE 26A (114). Proxy VCPE 34C may forward traffic in accordance with the firewall filter, redirecting the traffic to tunnel 36B so that home VCPE 26A applies subscription of nomad user operating CD 30 (116).

Figure 5:
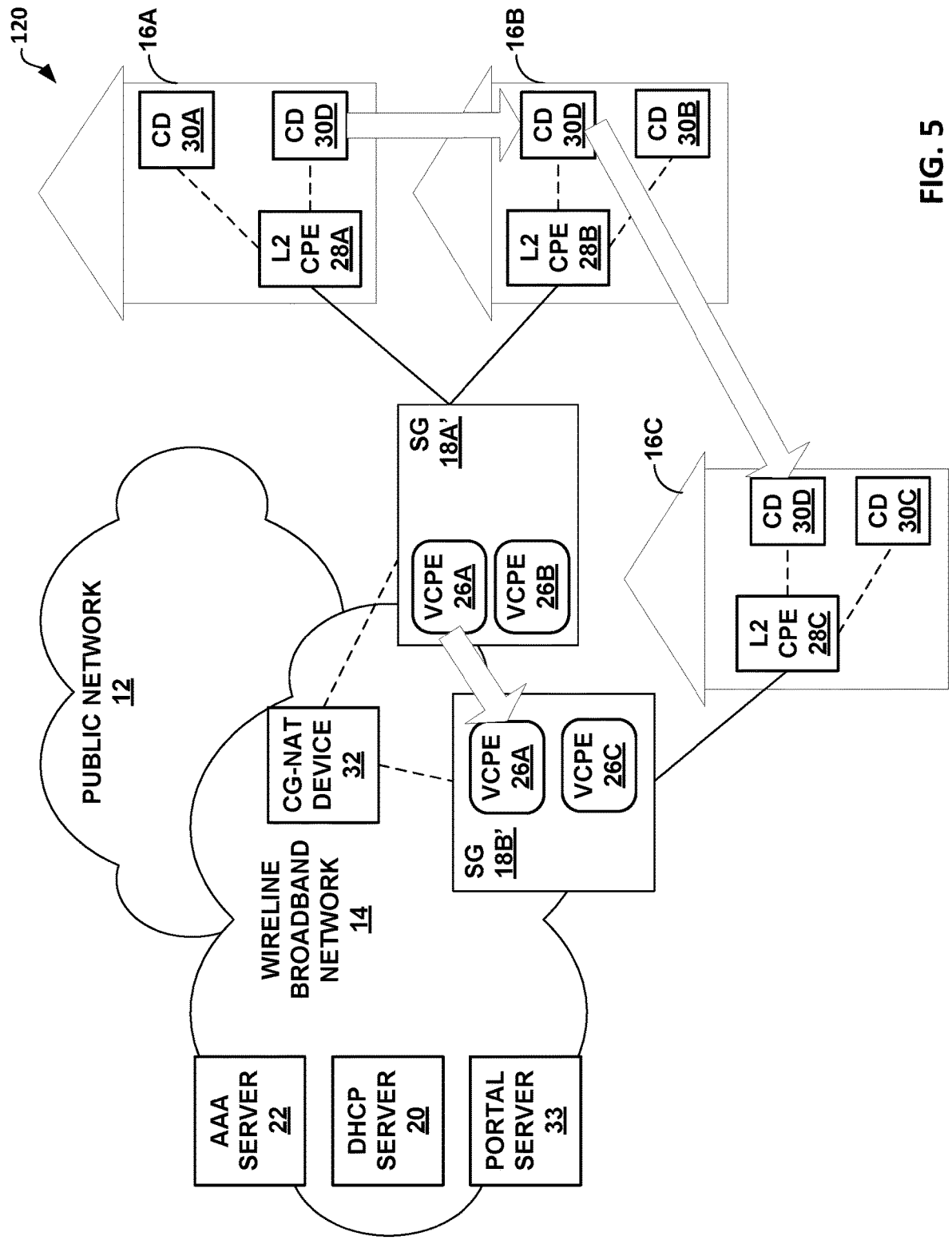
FIG. 5 is a diagram of an example system in which various aspects of the techniques described herein may be implemented.

FIG. 5 is a diagram of an example system 120 in which various aspects of the techniques described herein may be implemented. System 120 is similar to system 10 shown in the example of FIG. 1 in terms of the devices and networks. As such, the devices and networks use the same reference numerals to denote that these devices are substantially similar, except for SGs 18, which are denoted as SGs 18A' and 18B' (SGs 18'). SGs 18' are similar to SGs 18 except that rather than establish the above described tunnels 36, SGs 18' may instead transfer the home VCPE 26A between each other, effectively moving the subscription point from subscriber premises 16A to subscriber premises 16B and next to subscriber premises 16C.

In other words, SG 18A' may initially execute VCPE 26A when CDs 30A or 30D accesses wireline broadband network from subscriber premises 16A or subscriber premises 16B. When CD 30D moves to subscriber premises 16B and attempts to access wireline broadband network 14, SG 18A' may operate similar to SG 18A as described above except that SG 18A' may, in response to the change of authorization (similar to that described above with respect to FIG. 3), not configure tunnel 36A. Instead, SG 18A' may forward reconfigure VCPE 26A to operate with respect to an IP address assigned to CD 30 when accessing wireline broadband network 14 via subscriber premises 16B. In some instances, the IP address assigned to CD 30 at subscriber premises 16B may be the same as the previous IP address assigned to CD 30 at subscriber premises 16A. In such instances, SG 18A' may not need to reconfigure VCPE 26A.

When CD 30D moves to subscriber premises 16C and attempts to access wireline broadband network 14, SG 18B' may operate similar to SG 18B (as represented by router 40) as described above with respect to the example of FIG. 3. However, instead of forming tunnel 36B, SG 18B' may retrieve VCPE 26A from SG 18A' and reconfigure VCPE 26A to operate with respect to an IP address assigned to CD 30 when accessing wireline broadband network 14 via subscriber premises 16C. In some instances, the IP address assigned to CD 30 at subscriber premises 16C may be the same as the previous IP address assigned to CD 30 at subscriber premises 16A or 16B. In such instances, SG 18B' may not need to reconfigure VCPE 26A.

Figure 6:
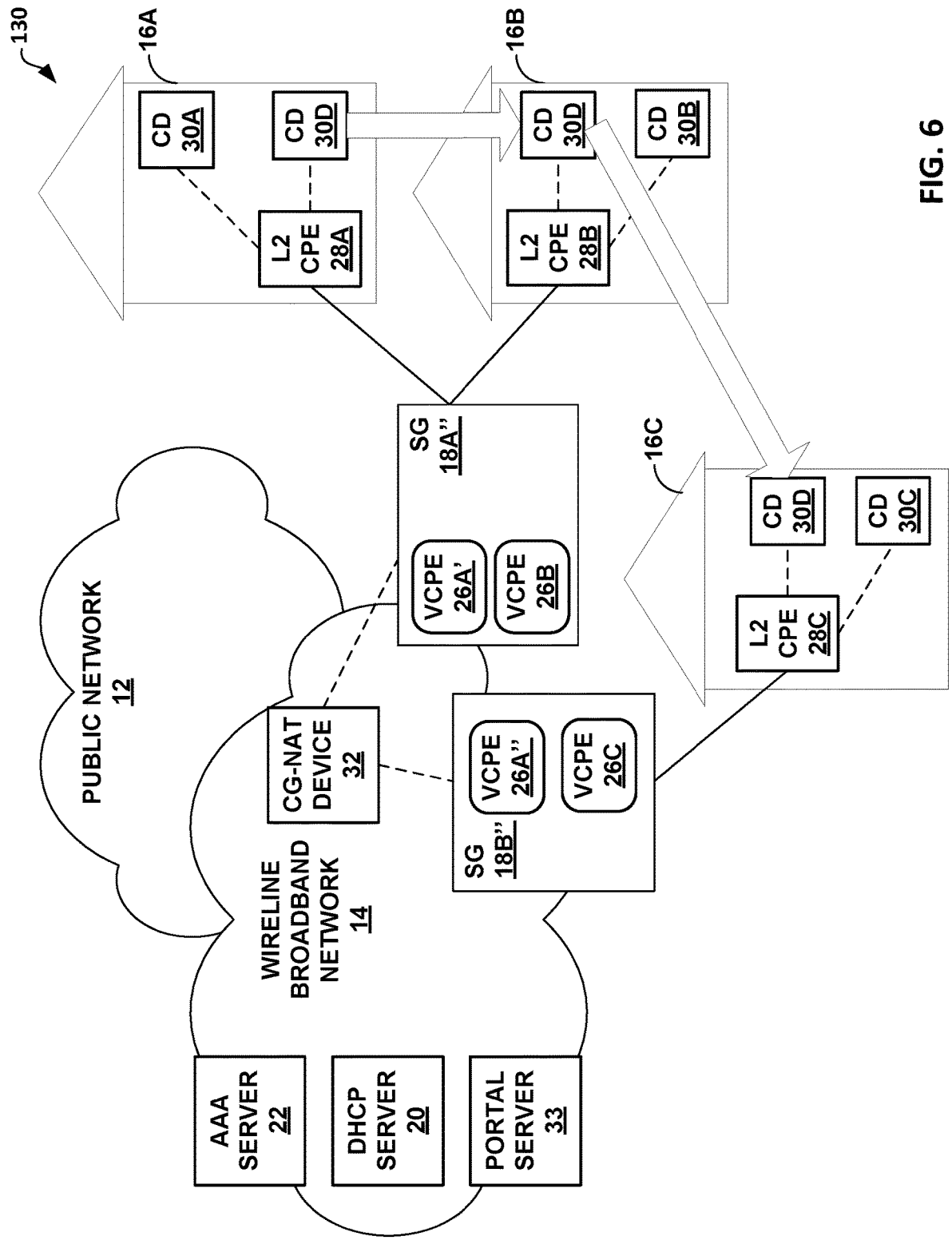
FIG. 6 is a diagram of another example system in which various aspects of the techniques described herein may be implemented.

FIG. 6 is a block diagram of an example system 130 in which various aspects of the techniques described herein may be implemented. System 130 is similar to system 120 shown in the example of FIG. 1 in terms of the devices and networks. As such, the devices and networks use the same reference numerals to denote that these devices are substantially similar, except for SGs 18', which are denoted as SGs 18A" and 18B" (SGs 18"). SGs 18" are similar to SGs 18' except that rather than establish the above described tunnels 36, SGs 18" may instead duplicate the home VCPE 26A, effectively creating two subscription points at subscriber premises 16A and subscriber premises 16B. As such, VCPE 26A is denoted as home VCPE 26A' and the duplicate home VCPE is denoted as home VCPE 26A".

VCPE 26A' and VCPE 26A" may be similar to one another or the same in terms of subscription. In some instances, each of VCPE 26A' and 26A" may be the same, each allocating half of the subscription terms (e.g., ½ of the bandwidth, volume, rate, etc.). In some instances, each of VCPE 26A' and VCPE 26A" may allocate the full subscription terms to each of VCPE 26A' and 26A", which may allow the service provider to charge extra for the better nomadicity terms.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry having one or more transistors (configured either by way of executing instructions or by way of actual physical arrangement to perform the techniques of this disclosure), as well as any combinations of such components. The term "processor" or "processing circuitry" may generally refer to any of the foregoing logic circuitry, alone or in combination with other logic circuitry, or any other equivalent circuitry. A control unit comprising such digital circuitry (or generally hardware) may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
executing, by a network device positioned in a wireline broadband network, a first virtual customer premises equipment to provide, to a first subscriber, access to the wireline broadband network from a physical customer premises equipment located at a first subscription point in accordance with a first subscription associated with the first subscriber and the first subscription point;

providing, by the network device to a second subscriber, access to the wireline broadband network from the physical customer premises equipment located at the first subscription point in accordance with a second subscription associated with the second subscriber and a second subscription point;

forwarding, by the network device in accordance with the first subscription, traffic received from the first subscription point and associated with the first subscriber; and forwarding, by the network device in accordance with the second subscription, traffic received from the first subscription point and associated with the second subscriber.

2. The method of claim 1, wherein providing access to the wireline broadband network for the second subscriber comprises executing a second virtual customer premises equipment for the second subscriber to provide the access to the wireline broadband network in accordance with the second subscription associated with the second subscription point.

3. The method of claim 1, wherein providing access to the wireline broadband network for the second subscriber comprises:
executing a proxy virtual customer premises equipment for the second subscriber separate from the first virtual customer premises equipment executed for the first subscriber; and
creating a tunnel from the proxy virtual customer premises equipment to a second virtual customer premises equipment for the second subscriber to provide the access to the wireline broadband network in accordance with the second subscription associated with the second subscription point.

4. The method of claim 1, wherein providing access to the wireline broadband network for the second subscriber comprises configuring the first virtual customer premises equipment associated with the first subscriber to:
act as a proxy virtual customer premises equipment for the second subscriber; and
create a tunnel from the proxy virtual customer premises equipment to a second virtual customer premises equipment for the second subscriber to provide the access to the wireline broadband network in accordance with the second subscription associated with the second subscription point.

5. The method of claim 4, wherein configuring the first virtual customer premises equipment associated with the first subscriber to act as the proxy virtual customer premises equipment for the second subscriber comprises:
retrieving, during authentication of the second subscriber to access the wireline broadband network, information identifying the second virtual customer premises equipment;
configuring the tunnel from the proxy virtual customer premises equipment to the second virtual customer premises equipment; and
installing a firewall filter that directs all traffic from a device associated with the second subscriber through the tunnel to the second virtual customer premises equipment.

6. The method of claim 5,
wherein the network device comprises a first network device that executes both the first virtual customer premises equipment and the proxy virtual customer premises equipment, and
wherein a second network device executes the second virtual customer premises equipment.

7. The method of claim 5, further comprising:
receiving, with the proxy virtual customer premises equipment, subscriber credentials associated with the second subscriber via an authentication portal served by the wireline broadband network; and
initiating the authentication of the second subscriber based on the subscriber credentials.

8. The method of claim 5, further comprising receiving a change of authorization from a different network device authorizing the installation of the firewall filter as a result of authenticating subscriber credentials associated with the second subscriber.

9. The method of claim 1, wherein providing access to the wireline broadband network for the second subscriber comprises executing a second virtual customer premises equipment for the second subscriber to provide the access to the wireline broadband network in accordance with the second subscription associated with the second subscription point without establishing a tunnel to redirect traffic to a third virtual customer premises equipment executed to provide access to the wireline broadband network for the second subscription point.

10. The method of claim 9, wherein providing access to the wireline broadband network for the second subscriber comprises executing a second virtual customer premises equipment for the second subscriber to provide the access to the wireline broadband network from the first subscription point in accordance with the second subscription associated with the second subscription point concurrent to execution of a third virtual customer premises equipment executed to provide access to the wireline broadband network for the second subscription point.

11. The method of claim 9, wherein providing access to the wireline broadband network for the second subscriber comprises transferring execution of a second virtual customer premises equipment for the second subscriber to the network device so as to provide the access to the wireline broadband network from the first subscription point in accordance with the second subscription associated with the second subscription point.

12. The method of claim 1, wherein the network device comprises one of a service gateway and a broadband network gateway.

13. A network device positioned in a wireline broadband network, comprising:
one or more processors configured to execute a first virtual customer premises equipment to provide, to a first subscriber, access to the wireline broadband network from a physical customer premises equipment located at a first subscription point in accordance with a first subscription associated with the first subscriber and the first subscription point, and provide, to a second subscriber, access to the wireline broadband network from the physical customer premises equipment located at the first subscription point in accordance with a second subscription associated with the second subscriber and a second subscription point; and
one or more interfaces configured to forward, in accordance with the first subscription, traffic received from the first subscription point and associated with the first subscriber, and forward, in accordance with the second subscription, traffic received from the first subscription point and associated with the second subscriber.

14. The network device of claim 13, wherein the one or more processors are configured to execute a second virtual customer premises equipment for the second subscriber to provide the access to the wireline broadband network in accordance with the second subscription associated with the second subscription point.

15. The network device of claim 13, wherein the one or more processors are configured to:
execute a proxy virtual customer premises equipment for the second subscriber separate from the first virtual customer premises equipment executed for the first subscriber; and
create a tunnel from the proxy virtual customer premises equipment to a second virtual customer premises equipment for the second subscriber to provide the access to the wireline broadband network in accordance with the second subscription associated with the second subscription point.

16. The network device of claim 13, wherein the one or more processors are configured to configure the first virtual customer premises equipment associated with the first subscriber to:
act as a proxy virtual customer premises equipment for the second subscriber; and
create a tunnel from the proxy virtual customer premises equipment to a second virtual customer premises equipment for the second subscriber to provide the access to the wireline broadband network in accordance with the second subscription associated with the second subscription point.

17. The network device of claim 16, wherein the one or more processors are configured to:
retrieve, during authentication of the second subscriber to access the wireline broadband network, information identifying the second virtual customer premises equipment;
configure the tunnel from the proxy virtual customer premises equipment to the second virtual customer premises equipment; and
install a firewall filter that directs all traffic from a device associated with the second subscriber through the tunnel to the second virtual customer premises equipment.

18. The network device of claim 17,
wherein the network device comprises a first network device that executes both the first virtual customer premises equipment and the proxy virtual customer premises equipment, and
wherein a second network device executes the second virtual customer premises equipment.

19. The network device of claim 17,
wherein the one or more processors are further configured to:
receive, with the proxy virtual customer premises equipment, subscriber credentials associated with the second subscriber via an authentication portal served by the wireline broadband network; and
initiate the authentication of the second subscriber based on the subscriber credentials.

20. The network device of claim 17, wherein the one or more interfaces are further configured to receive a change of authorization from a different network device authorizing the installation of the firewall filter as a result of authenticating subscriber credentials associated with the second subscriber.

21. The network device of claim 13, wherein the one or more processors are configured to execute a second virtual customer premises equipment for the second subscriber to provide the access to the wireline broadband network in accordance with the second subscription associated with the second subscription point without establishing a tunnel to redirect traffic to a third virtual customer premises equipment executed to provide access to the wireline broadband network for the second subscription point.

22. The network device of claim 21, wherein the one or more processors are configured to execute a second virtual customer premises equipment for the second subscriber to provide the access to the wireline broadband network from the first subscription point in accordance with the second subscription associated with the second subscription point concurrent to execution of a third virtual customer premises equipment executed to provide access to the wireline broadband network for the second subscription point.

23. The network device of claim 21, wherein the one or more processors are configured to transfer execution of a second virtual customer premises equipment for the second subscriber to the network device so as to provide the access to the wireline broadband network from the first subscription point in accordance with the second subscription associated with the second subscription point.

24. The network device of claim 13, wherein the network device comprises one of a service gateway and a broadband network gateway.

25. A non-transitory computer-readable storage medium having stored thereon instructions that, when executed, cause one or more processors of a network device positioned in the wireline broadband network to:
   execute a first virtual customer premises equipment to provide, to a first subscriber, access to the wireline broadband network from a physical customer premises equipment located at a first subscription point in accordance with a first subscription associated with the first subscriber and the first subscription point;
   provide, to a second subscriber, access to the wireline broadband network from the physical customer premises equipment located at the first subscription point in accordance with a second subscription associated with the second subscriber and a second subscription point;
   forward, in accordance with the first subscription, traffic received from the first subscription point and associated with the first subscriber; and
   forward, in accordance with the second subscription, traffic received from the first subscription point and associated with the second subscriber.

26. A network system comprising:
   a wireline broadband network configured to provide access to a public network; and
   a network device positioned in the wireline broadband network, the network device comprising:
      one or more processors configured to execute a first virtual customer premises equipment to provide, to a first subscriber, access to the wireline broadband network from a physical customer premises equipment located at a first subscription point in accordance with a first subscription associated with the first subscriber and the first subscription point, and provide, to a second subscriber, access to the wireline broadband network from the physical customer premises equipment located at the first subscription point in accordance with a second subscription associated with the second subscriber and a second subscription point; and
      one or more interfaces configured to forward, in accordance with the first subscription, traffic received from the first subscription point and associated with the first subscriber, and forward, in accordance with the second subscription, traffic received from the first subscription point and associated with the second subscriber.

\* \* \* \* \*